United States Patent [19]

Fiedler

[11] Patent Number: 5,299,361
[45] Date of Patent: Apr. 5, 1994

[54] MULTI-COORDINATE PROBE

[75] Inventor: Karl Fiedler, Surberg, Fed. Rep. of Germany

[73] Assignee: Dr. Johannes Heidenhain GmbH, Traunreut, Fed. Rep. of Germany

[21] Appl. No.: 919,514

[22] Filed: Jul. 24, 1992

[30] Foreign Application Priority Data

Jul. 26, 1991 [EP] European Pat. Off. ........ 91112552.4

[51] Int. Cl.⁵ .................................... G01B 5/03
[52] U.S. Cl. ................................ 33/559; 33/561
[58] Field of Search ............ 33/556, 557, 558, 559, 33/560, 561

[56] References Cited

U.S. PATENT DOCUMENTS

| | | | |
|---|---|---|---|
| 2,831,260 | 4/1958 | Shaw | 33/559 |
| 4,447,958 | 5/1984 | Tanaka | 33/559 |
| 4,516,327 | 5/1985 | Kanda et al. | 33/559 |
| 4,625,417 | 12/1986 | Cusack | 33/561 |
| 4,763,417 | 8/1988 | Ernst | 33/561 |
| 4,829,677 | 5/1989 | Yuzuru | 33/561 |

FOREIGN PATENT DOCUMENTS 2742817 4/1978 Fed. Rep. of Germany .
3508396 9/1985 Fed. Rep. of Germany .
3640160 6/1988 Fed. Rep. of Germany .

Primary Examiner—Thomas B. Will
Attorney, Agent, or Firm—Anderson Kill Olick & Oshinsky

[57] ABSTRACT

A multi-coordinate probe is described for use in measuring machines and machine tools for measurement of workpieces. A support system is described which is configured as a multi-point bearing or support having a plurality of support points. Each support point comprises a bushing integrated into the measuring dish by way of a counter member for a ball as a support member and which is alignable with a bushing in the probe housing base. The automatic adjustment of the ball is assured by a spherical member carrying the ball and being rotatably supported in a seat or lodgment. In case of a misalignment between the bushing and the ball, a torque acting upon the spherical member causes an alignment of the ball. In the adjusted stable position, the spherical members are fixed relative to their seat or lodgment.

24 Claims, 5 Drawing Sheets

MULTI-COORDINATE PROBE

FIELD OF THE INVENTION

The present invention deals with a multi-coordinate probe which can be used in measuring as well as in switching multi-coordinate probes.

BACKGROUND OF THE INVENTION

A multi-coordinate probe having several support points is discussed in DE-PS 27 42 817. A V-groove is located concentrically around the probe head axis in a measuring dish which is connected with the probe pin or feeler. A V-groove, which also extends in an annularly-shaped fashion, is located so as to be opposite to the first groove in the housing of the probe. Several spheres or balls are bonded into each one of these V-grooves, wherein each bearing support is constituted by the co-operation of three spheres. The spheres are located opposite each other in such a manner, that each sphere in the measuring dish contacts two spheres in the housing of the probe.

In order to assure that the desired contact occurs between the spheres, one allows the balls to roll freely into their grooves during the set-up or adjustment process, wherein they then align themselves as a result of the spring force exerted upon the measuring dish and the curvature of the spheres. Subsequent to this adjustment, a bonding agent or adhesive, inserted into the V-groove, is cured or hardened and retains the spheres in the V-groove.

Since every sphere adjusts itself in a circumferential direction as a function of all other spheres, the frictional forces during the set-up or adjustment process are added and thus the force required for the adjustment is increased. Further, it has been seen that non-uniform relatively large bonding gaps form between the individual spheres and the V-groove whereby unequal elastic properties and rigidity of the individual bearing or support points are produced. The large bonding gaps, especially in the circumferential direction of the V-grooves, causes a displacement or migration of the spheres or balls during temperature changes as well as due to the effects of humidity.

A multi-coordinate probe is known from the DE-PS 35 08 396, wherein each bearing or support point is individually adjustable independently of the other support points. Each support point is formed by a sphere and an adjustable cylindrical member with a V-groove. Each cylindrical member is rotatable around its axis and axially displaceable, so that the V-groove can be aligned with the associated sphere. It is disadvantageous in this arrangement, however, that each bearing or support point is only formed by two points of contact between a V-groove and a sphere. This point contact results in a relatively low rigidity of the individual support points.

In order to increase the rigidity, a multi-coordinate probe was proposed in DE-PS 36 40 160, wherein each bearing or support point was formed by an axially and radially adjustable bearing and counter member. The contact zones of the respective surface regions of the support or bearing members and the surface regions of the associated counter members, respectively, form a circular line. The adjustment of a cone-shaped bore with respect to a sphere is performed by means of a double eccentric cam. The cone-shaped bore is placed externally of the rotational axis of a rotatable cylinder. This cylinder is eccentrically supported in a rotatable receiving cylinder. For adjustment, the inner cylinder and the receiving cylinder must be rotated against each other and displaced in an axial direction. This probe, however, requires greater fabrication efforts.

SUMMARY OF THE INVENTION

The present invention deals with a multi-coordinate probe which can be used in measuring as well as in switching multi-coordinate probes. It is particularly important, in both embodiments, that the probe pin or feeler, during the course of touch-probing or touch-sensing of a workpiece, be reproducibly deflectable from any random initial probing direction.

The present invention is concerned with creating a bearing arrangement or support, for multi-coordinate probes, which assures defined as well as constant touch-probing conditions in all touch-initial probing directions.

The present invention deals with a multi-coordinate probe which has at least one probing pin or feeler which is deflectable in several coordinate directions and which is supported in a support system or bearing system which has several support points. Each support point or location is formed by the cooperation of the surface regions of the support members and counter members which are adjustable to each other both axially and radially. The support members and/or the counter members are adjustable by a spherical member which is rotatable in a seat.

The multi-coordinate probe of the present invention provides support systems having increased longevity and rigidity compared to probes known to the prior art. Further, the multi-coordinate probe of the present invention provides for a precise and simple assembly and adjustment.

Accordingly, it is an object of the present invention to provide a multi-coordinate probe having increased longevity and rigidity compared to prior art probes.

It is another object of the present invention to provide a multi-coordinate probe which provides for a precise and simple assembly and adjustment thereof.

It is another object of the present invention to provide a multi-coordinate probe wherein the support members of every support location can align themselves automatically with respect to the associated counter members and independently of the support or bearing members.

It is yet another object of the present invention to provide a multi-coordinate probe which provides assured repeatability of measurements independently of the touch-probing direction.

It is yet another object of the present invention to provide a multi-coordinate probe wherein the high degree to rigidity and longevity of each support point is assured by the design of the bearing or support system.

Other objects and advantages of the present invention will be made apparent to those persons skilled in the art after a review of the Description of the Preferred Embodiment taken in conjunction with the Drawings which follow.

DESCRIPTION OF THE PREFERRED EMBODIMENT

Figure 1:
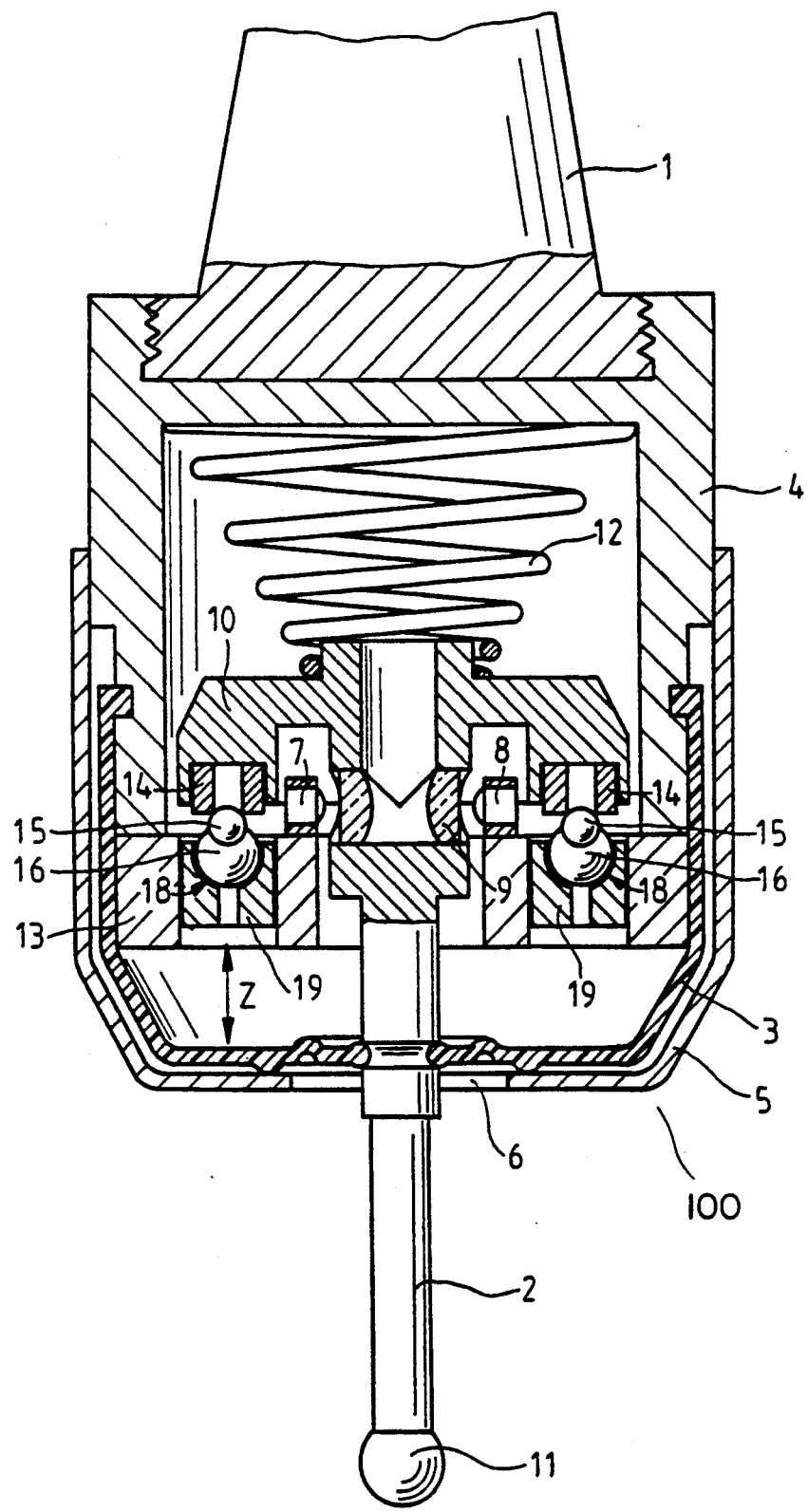
FIG. 1 illustrates the multi-coordinate probe of the present invention in an axial section view.
Figure 2:
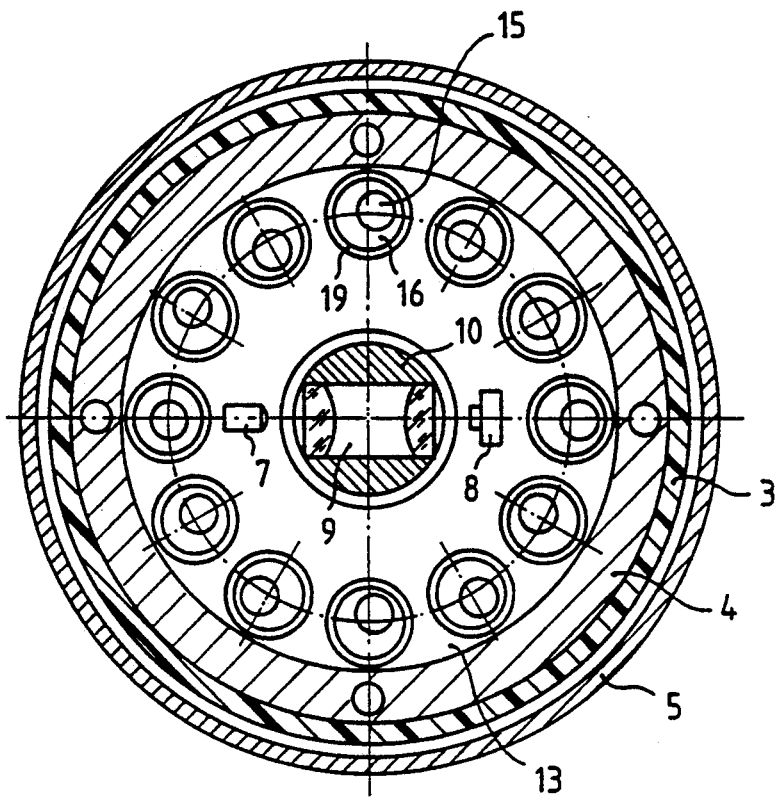
FIG. 2 illustrates the multi-coordinate probe of the present invention in a section view along the line II—II of FIG. 1 wherein the measuring dish is removed.

FIGS. 1 and 2 illustrate the multi-coordinate probe of the present invention which is denoted generally by the reference numeral 100. The multi-coordinate probe 100 of the present invention is designed, in its preferred embodiment, as a switching probe. Such a multi-coordinate probe, which may alternately be referred to as a 3 D-probe, a trigger-probe, or a touch-sensor, is a mechanical precision instrument, which has a clamping shaft 1 for insertion into a mandrel of a measuring or machining apparatus (not shown). The probe 100 also comprises a feeler or probing pin 2. The movement or deviation of a feeler or probing pin 2 in all directions is possible. A seal 3 seals the intermediate space located between a probe housing 4 and the probing pin 2. A sheet metal protection 5 is also utilized which prevents damage to the seal 3 such as may be caused by hot shavings while also providing a free space in the region 6 which permits a limited movement of the probing pin 2 from its neutral or zero position.

The probing pin 2 is connected to a measuring dish 10, into whose end face a plurality of bushings 14, which serve as counter members, are inserted in an annularly-shaped arrangement. The bushings 14 rest on spheres or balls 15 as bearing or support members. Each bushing 14 and the sphere 15 associated therewith constitutes a support point. Identical support points are concentrically arranged uniformly in a plane around the probe axis. If the touch-probe or sphere 11, which is fastened to the probing pin 2, contacts with a workpiece, the measuring dish 10 rises against the effect of a pre-stressing spring 12. The center of the measuring dish 10 is then displaced upwards independently of the touch-probing direction, and thus in a direction of the clamping shaft 1.

A detector arrangement is also provided in the form of a light or photoelectric-barrier, which consists of an LED 7 (light emitting diode), a system of lenses 9 and a differential photoelectric cell 8, and which serves to issue a probing pulse at a specific magnitude of movement of the measuring dish 10 and the system of lenses 9. This probing or switching pulse is utilized for the determination of the instant in time of the measured value takeover of a coordinate measuring machine or for control of a machine tool.

In order to keep the transmission ratio constant between the sideways movement of the touch-probing ball 11 and the height of movement of the system of lenses 9, independent of the touch-probing direction, the balls or spheres 15 in the probe housing base 13 are adjustable axially and radially relative to the bushings 14. Because of this adjustability, the tolerances which are unavoidable in a fabrication process, can be compensated for with respect to each other. For adjustment purposes, each sphere or ball 15 is fastened in a spherical member 16, which is swivelable in all directions around its center. Preferably, the ball 15 is pressed into a bore 17.

Figure 4:
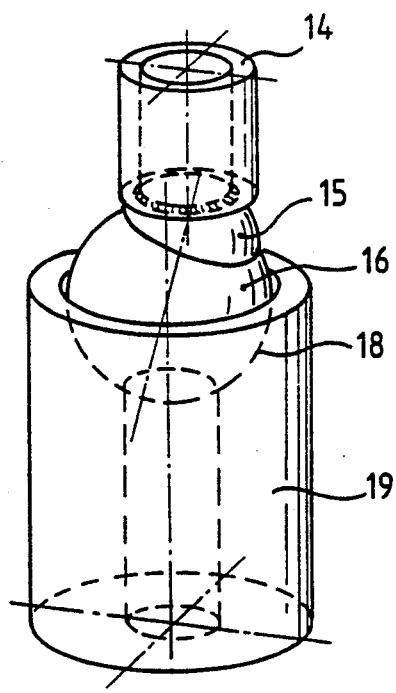
FIG. 4 illustrates a perspective view of the bearing or support member and counter member of FIG. 3.
Figure 3:
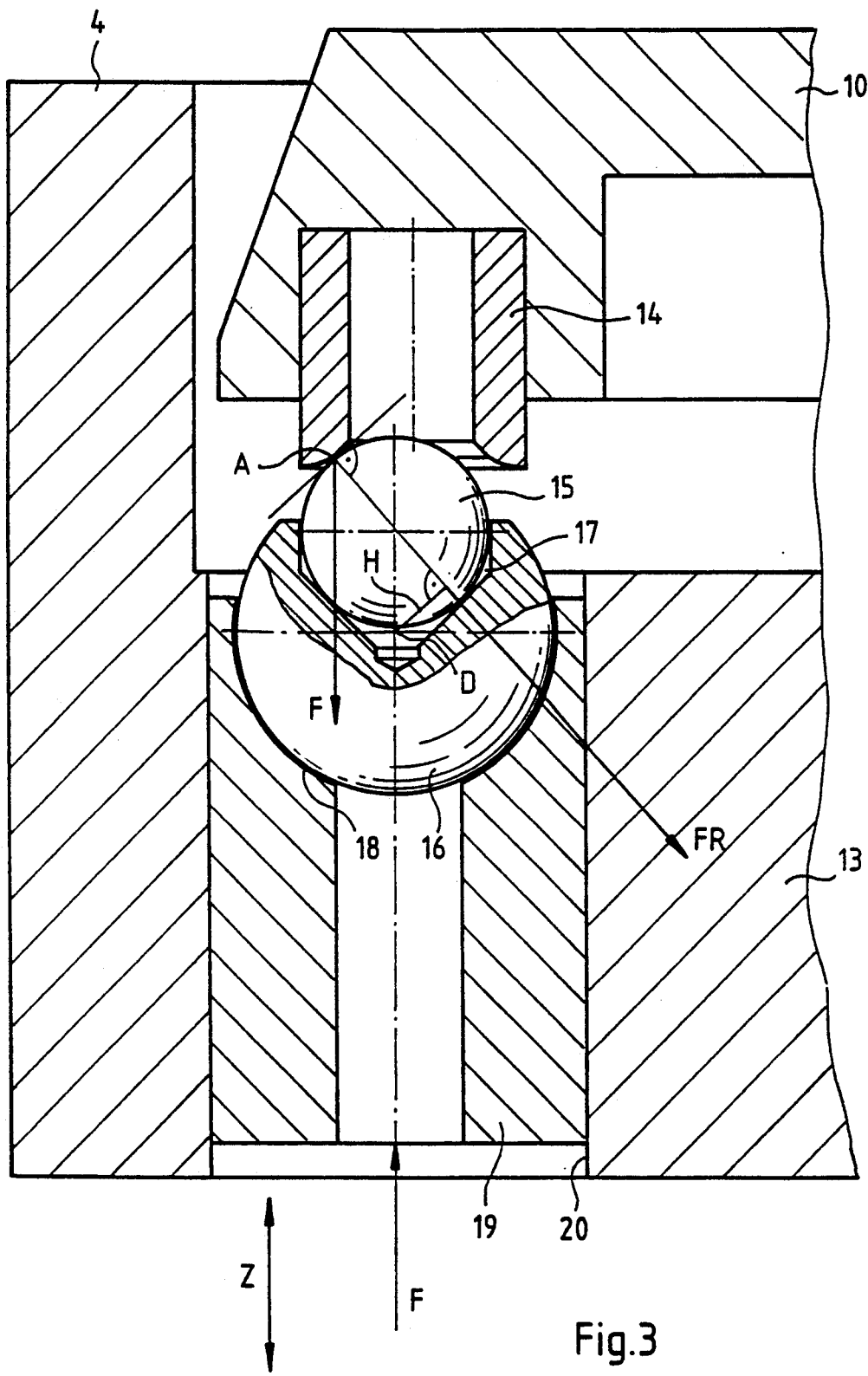
FIG. 3 illustrates a sectional view of a bearing or support point of the multi-coordinate probe of FIGS. 1 and 2.

FIG. 3 illustrates, in magnified sections, a bearing or support point while FIG. 4 illustrates a bearing or support point in a perspective view.

Each spherical member 16 is rotatably supported in a seat or lodgment 18. The seat 18 is disposed in an axially displaceable retainer 19 in the form of a bushing. The surface of the seat 18 is adapted in such a manner to the spherical member 16, that the spherical member 16 can rotate around its center point with as little clearance as possible. The diameter of the spherical member 16 may typically be 5 mm and the diameter of the pressed-in ball 15 is typically selected to be 3 mm.

During the course of the adjustment, the seat 18 as well as the bore 20 for the retainer 19 in the measuring dish 10, is brushed with a bonding agent curable or hardenable so as to be free of warps. The spherical members 16 are placed into the seat 18 of the retainers 19. The retainers 19 are introduced into the bores 20 of the housing base 13. The retainers 19 are displaced in the axial direction (the Z-direction), until each ball 15 cooperates in such a manner with its associated bushing 14, that the contact zones of the respective surfaces form, respectively, a circular line.

It is evident from FIG. 3 that ball 15 adapts in a bushing 14 through the rotation of the spherical member 16. If a force F is exerted upon the retainer 19 in the Z-direction then this same force F acts in case of a misalignment at the point of engagement A between the surface regions of the bushing 14 and the ball 15. This force F exerts a torque upon the spherical member 16, referred to the point of rotation D of the spherical member 16, in such a manner that the resultant force FR acts at lever arm H as shown. This torque causes a rotation of the spherical member 16 until the ball 15 contacts the bushing 14 which also lies opposite same. The contact is thus shaped like a circular ring. In this manner the position of each ball 15 is adapted to the corresponding bushing 14. The position of a ball 15 is illustrated in perspective view in FIG. 4. The rigidity of each bearing or support point is particularly favorable if the ball 15 cooperates with the rounded-off edge of the bushing 14.

After the curing of a bonding agent this support arrangement affords the advantage of a high degree, and uniform, rigidity which is independent of the touch-probing direction, so that a most favorable switching or shifting characteristic is assured.

The force F, which is required for the adjustment process, can for example, be supplied by an arrangement of springs associated with the retainers 19 or by application of compressed air to the retainers 19. It can be easily seen that each ball 15 adjusts itself automatically and radially by swiveling around the center point of the associated spherical member 16 and that the resetting in the Z-direction occurs by the displacement of the retainer 19.

In the embodiment illustrated, the bushings, which are bonded into the measuring dish 10, are provided as counter or matching members for the balls 15. The bore or the groove in the measuring dish 10 or the several roll-shaped members which cooperate with the ball 15 by means of their spherically curved surfaces, can also be provided as counter members for each ball 15.

Figure 5:
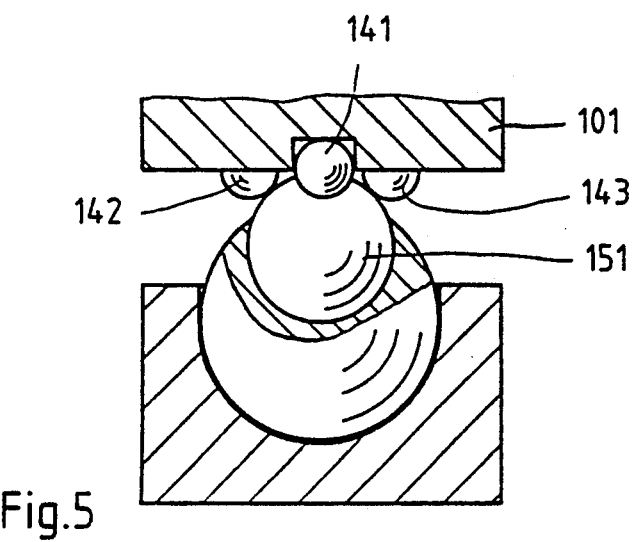
FIGS. 5 to 9 illustrate alternate embodiments for the bearing or support members and counter members.

FIG. 5 illustrates an alternate embodiment of the arrangement of the bearing or support members and counter members. In FIG. 5, three balls 141, 142, 143, which are offset from each other in a plane through 120., are fastened to the measuring dish 101 by way of counter members for a ball 151. In the adjusted state, the ball 151 lies in the center of the three balls 141, 142 and 143 and contacts with each ball 141, 142 and 143 at a single point or location. It is also envisioned that several balls, for example, four balls, can be utilized to form a counter member.

Figure 6:
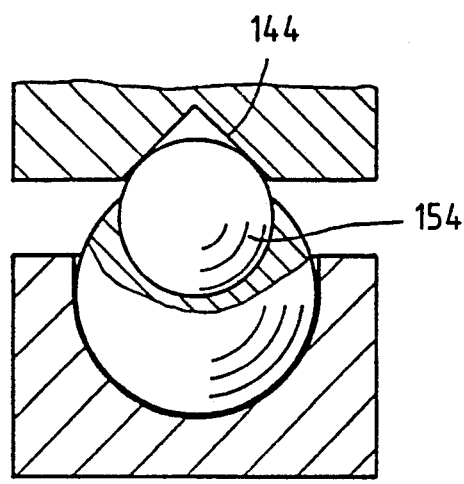

In the embodiment illustrated in FIG. 6, a cone-shaped bore 144 can serve as a counter member or matching member for the ball 154. A recess in the shape of a negative pyramid tip is also envisioned wherein the associated ball abuts itself as a bearing or support member at a point or location on each of the three pyramid faces and wherein each support location constitutes a three-point support.

In the above-mentioned example, the bearing or support member which cooperates with the counter member or matching member must not be configured as a separate ball. Further, the surface which is curved in a spherical manner and which cooperates with the counter member, can also be molded to the spherical member and be rotatable around its center point for adjustment.

Figure 7:
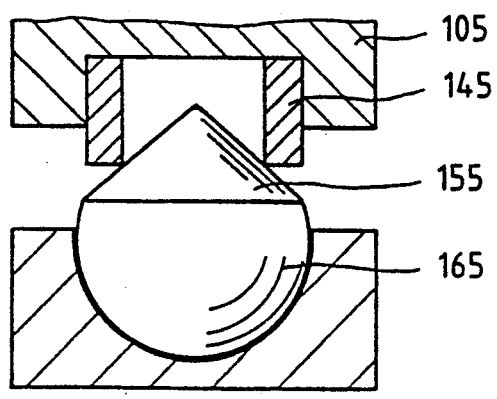

FIG. 7 illustrates another alternate embodiment of the arrangement of the bearing or support members and counter members wherein the support members can be designed as cones 155, which are molded integrally to the spherical members 165. In this embodiment, a bushing 145, located in the measuring dish 105, can serve as the counter member. It is also equally conceivable for the counter members to be in the form of bores, grooves, or roller-shaped members which are disposed in the measuring dish 105 or in the arrangement of FIG. 5 wherein three balls are offset through 120° with respect to each other and with the cone resting against the three balls at a location in the center of said three balls.

It is also envisioned that a pyramid tip can be provided instead of the cone 155, which cooperates with the three balls which are offset through 120° from each other, as the counter members. In the adjusted state, each ball contacts a pyramid face at a single point. In this manner, each support location corresponds to a three-point support.

Figure 8:
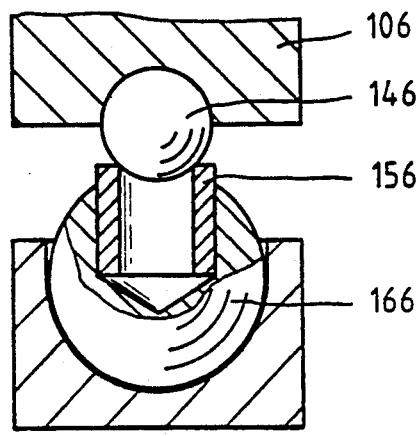

As illustrated in FIG. 8, the support member can be fixed as a bushing 156 in the spherical member 166. A ball 146, which is placed in the measuring dish 106, is illustrated as a counter member. It should be noted that it is also equally conceivable to utilize a cone instead of ball 146.

Figure 9:
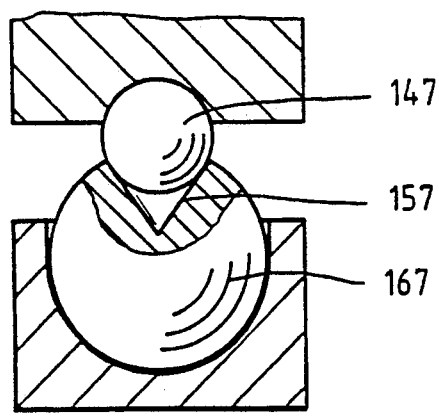

In the alternate embodiment of FIG. 9, a spherical member 167, having a cone-shaped bore 157 disposed therein, serves as a support member. While a ball 147 coacts as a counter member with the surface of the conical bore 157 in the embodiment of FIG. 9 it is also equally conceivable to utilize a cone as a counter member.

It is also conceivable to utilize a groove, which is disposed in the spherical member in a manner (not shown), which cooperates with a ball, a cone, or a roller-shaped member which may be in the form of a cylinder.

The elements and surface shapes, described herein as the support members, can also be utilized as counter members, wherein the counter members may then serve as support members. It is also equally possible that the counter members described above are provided in a spherical member which is adjustable and supported as described above.

While the support members are axially displaceable in the Z-direction in all of the described embodiments, it is also possible for the support members to be fixed in the Z-direction while the counter members can be axially displaceable for reset in the Z-direction. Further, the adjustable support members can also be provided with seats or lodgments in the measuring dish so that the counter members can be arranged in the base of the probe housing.

As described above, it is particularly advantageous if the spherical members are immobilized or fixed in their seats by the curing of the bonding agent after a final alignment of the support members with respect to the counter members has been accomplished. In addition to this method, however, other methods for fixing the position of the spherical members in their seats, such as by sealing or pouring after final adjustment, are also conceivable.

The support system in the present invention can also be utilized in an overload safety feature arrangement or in a replacement arrangement for probing pins, probe heads and tool bits.

While the present invention has been described in various preferred embodiments, such descriptions are merely illustrative of the present invention and are not meant to be limitations thereof. In this regard, the present invention is meant to encompass all modifications and/or variations with the scope of the present invention limited only by the claims which follow.

I claim:

1. A multi-coordinate probe comprising:
   at least one probing pin which is deflectable in several coordinate directions; and
   a support system for supporting said probing pin, wherein said support system has a plurality of support points, wherein each support point is formed by the cooperation of surface regions of a support member and a counter member, and further wherein each support point includes a spherical member which supports said support member and is rotatable to provide for both an axial adjustment and a radial adjustment of said support member and said counter member to each other, and a seat for supporting said spherical member.

2. The multi-coordinate probe of claim 1 wherein a force is applied at said surface regions during an adjustment, wherein said force exerts a torque upon said spherical member around a point of rotation of said spherical member, and further wherein said support member adapts to a said counter member, and further wherein said spherical member is unmovably installed in said seat subsequent to said adjustment.

3. The multi-coordinate probe of claim 1 wherein said support points are arranged concentrically around an axis said probing pin.

4. The multi-coordinate probe of claim 1 wherein said support member is configured as one of a ball and a cone which is one of fastened and molded to said spherical member.

5. The multi-coordinate probe of claim 4 wherein one of said ball and said cone coacts with said counter member in such a manner that zones of contact of surface regions of one of said ball and said cone form a circular line with surface regions of said counter member.

6. The multi-coordinate probe of claim 4 wherein one of said ball and said cone cooperates with surface regions of at least one of a bore, a bushing, several other balls, several roller-shaped members, and a groove associated with said counter member.

7. The multi-coordinate probe of claim 6 wherein said several other balls are arranged to be offset through 120° relative to each other, and wherein said one of said ball and said cone forms a multi-point support system with said several other balls.

8. The multi-coordinate probe of claim 1 wherein said support member is configured as one of a bore, a cone shaped bore, a groove and a bushing.

9. The multi-coordinate probe of claim 8 wherein said counter member is configured as one of a ball and a cone.

10. The multi-coordinate probe of claim 1 wherein said seat of said spherical member is provided in a measuring dish, which is connected with said probing pin, and wherein said counter member is provided in a probe housing.

11. The multi-coordinate probe of claim 2 wherein said seat of said spherical member is provided in a measuring dish, which is connected with said probing pin, and wherein said counter member is provided in a probe housing.

12. The multi-coordinate probe of claim 4 wherein said seat of said spherical member is provided in a measuring dish, which is connected with said probing pin, and wherein said counter member is provided in a probe housing.

13. The multi-coordinate probe of claim 1 wherein said seat of said spherical member is provided in a probe housing and wherein said counter member is provided in a measuring dish supported in said probe housing.

14. The multi-coordinate probe of claim 2 wherein said seat of said spherical member is provided in a probe housing and wherein said counter member is provided in a measuring dish supported in said probe housing.

15. The multi-coordinate probe of claim 4 wherein said seat of said spherical member is provided in a probe housing and wherein said counter member is provided in a measuring dish supported in said probe housing.

16. The multi-coordinate probe of claim 1 wherein at least one of said seat of said spherical member and a seat of said counter member is attached at an axially displaceable retainer.

17. The multi-coordinate probe of claim 2 wherein at least one of said seat of said spherical member and a seat of said counter member is attached at an axially displaceable retainer.

18. The multi-coordinate probe of claim 4 wherein at least one of said seat of said spherical member and a seat of said counter member is attached at an axially displaceable retainer.

19. The multi-coordinate probe of claim 10 wherein at least one of said seat of said spherical member and a seat of said counter member is attached at an axially displaceable retainer.

20. The multi-coordinate probe of claim 11 wherein at least one of said seat of said spherical member and a seat of said counter member is attached at an axially displaceable retainer.

21. The multi-coordinate probe of claim 12 wherein at least one of said seat of said spherical member and a seat of said counter member is attached at an axially displaceable retainer.

22. The multi-coordinate probe of claim 13 wherein at least one of said seat of said spherical member and a seat of said counter member is attached at an axially displaceable retainer.

23. The multi-coordinate probe of claim 14 wherein at least one of said seat of said spherical member and a seat of said counter member is attached at an axially displaceable retainer.

24. The multi-coordinate probe of claim 15 wherein at least one of said seat of said spherical member and a seat of said counter member is attached at an axially displaceable retainer.

* * * * *